No. 782,966. PATENTED FEB. 21, 1905.
C. W. KENNER.
VALVE.
APPLICATION FILED JULY 1, 1904.
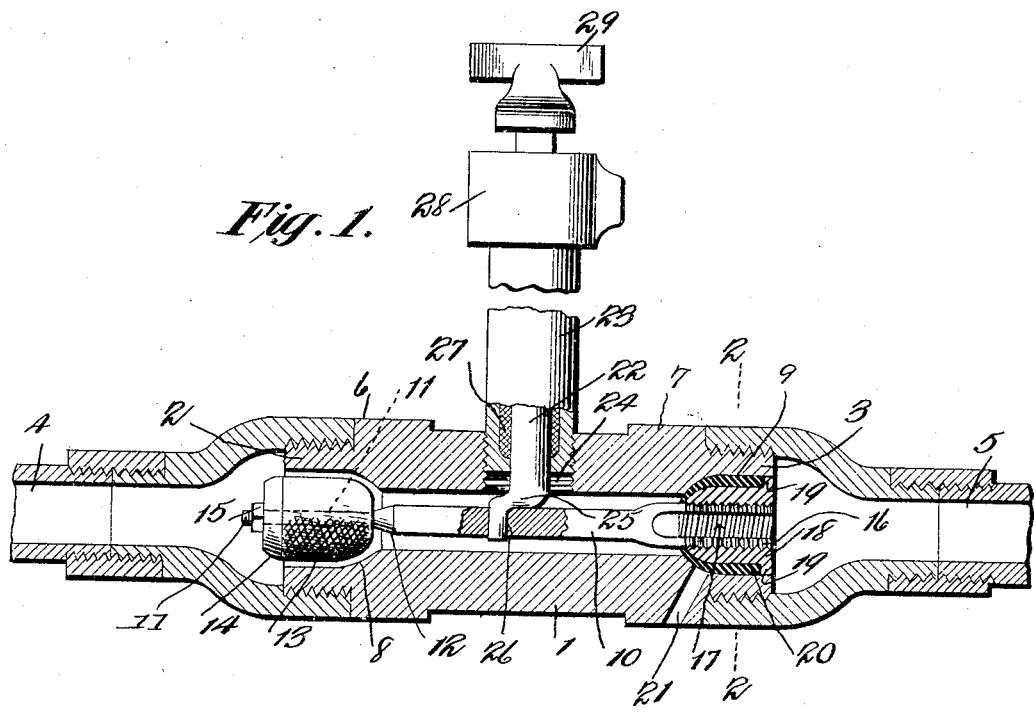
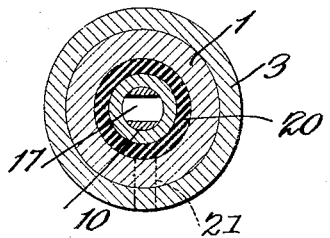
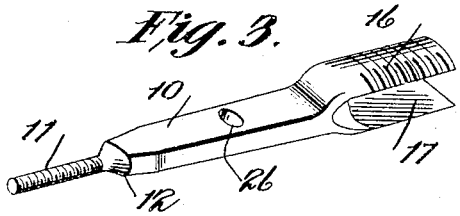
Christian William Kenner,
Inventor
Witnesses
by C. A. Snow & Co
Attorneys No. 782,966.                                              Patented February 21, 1905.

UNITED STATES PATENT OFFICE.

CHRISTIAN W. KENNER, OF BRITTON, SOUTH DAKOTA.

VALVE.

SPECIFICATION forming part of Letters Patent No. 782,966, dated February 21, 1905.

Application filed July 1, 1904. Serial No. 215,009.

*To all whom it may concern:*

Be it known that I, CHRISTIAN W. KENNER, a citizen of the United States, residing at Britton, in the county of Marshall and State of South Dakota, have invented a new and useful Valve, of which the following is a specification.

This invention relates to valves, and has for its object to provide an improved valve construction especially designed for use in connection with water systems to effectually drain the valve-casing when the valve has been closed, so as to obviate the accumulation of standing water in the valve and freezing thereof.

Another object of the invention is to embody the same in form for convenient connection with supply-pipes and to have the movable valve member capable of being controlled from points adjacent and remote from the valve-casing. It is furthermore designed to facilitate the assemblage of the parts of the valve and to provide for the convenient replacement thereof when worn or damaged.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a longitudinal sectional view of a waste-valve embodying the features of the present invention. Fig. 2 is a cross-sectional view on the line 2 2 of Fig. 1. Fig. 3 is a detail perspective view of the valve-stem removed from the valve-casing.

Like characters of reference designate corresponding parts in each and every figure of the drawings.

In the present embodiment of this invention the valve-casing 1 is substantially tubular in shape with its opposite ends open and provided with terminal externally-screw-threaded couplings 2 and 3, respectively, for connection with pipe-sections 4 and 5, respectively, in any suitable manner. At the inner ends of the couplings 2 and 3 the casing is provided with polygonal shoulders 6 and 7, forming wrench-seats for convenience in applying and removing the casing. The middle portion of the bore of the casing is reduced in diameter and the opposite shoulders 8 and 9, produced thereby, are merged into the inner walls of the couplings, so as to provide concaved valve-seats, the shoulder or seat 8 being located at the inlet end of the casing.

Within the valve-casing is a valve-stem 10, which is capable of working in an endwise direction through the casing and has that terminal which is located in the inlet end of the casing reduced, as at 11, thereby providing a shoulder 12 at the inner end of the reduced portion. A tapered expansible valve 13, preferably of rubber, is fitted upon the reduced portion 11 of the stem and is held thereon by means of a washer 14, bearing against the outer end of the valve, and a nut 15, fitted to the outer extremity of the reduced portion of the stem and engaging the washer. By this means of connecting the valve to the stem said valve may be readily replaced when worn or damaged. This valve 13 works in the inlet-coupling 2 and coöperates with the valve-seat 8 to control the passage of water through the valve-casing. The opposite end of the stem is enlarged and externally screw-threaded, as at 16, there being a longitudinal bifurcation 17 formed in the screw-threaded end of the stem to provide a longitudinal passage, which is open at its outer end to admit of the water passing therethrough and into the pipe 5. An open-ended metallic bushing 18 is engaged with the threaded terminal 16 of the stem and is provided at its outer end with an annular shoulder 19 to prevent outward displacement of the rubber or other elastic packing 20, which embraces the bushing and coöperates therewith to form a plug or valve to have a working fit within the outlet-coupling 3 and capable of closing the vent or drain opening 21, which pierces the valve-casing and communicates with the interior of the outlet-opening. It will of course be understood that the intermediate portion of the valve-stem is smaller in diameter than the bore of the casing, so as to permit of the water passing through the bore at all sides of the stem and then entering into the longitudinal passage 17 and through the open outer end thereof into the supply-pipe.

When the valve-stem is shifted to the left, the valve 13 is unseated, and the water can pass through the casing and thence outwardly therethrough through the passage 17 in the valve-stem, the vent or drain opening 21 being closed by the valve carried by the rear end of the stem. Upon shifting the valve-stem to its opposite limit the valve 13 will be seated, thereby cutting off the supply, and at the same time the valve 20 will be moved away from the vent-opening 21, so as to uncover the latter, whereby such water as may have accumulated in the casing will escape through the drain-opening.

For convenience in shifting the valve-stem I employ a controlling device, consisting of a rotatable rod 22, which is mounted within a tubular sleeve 23, having its inner end threaded into an opening 24, formed in the valve-casing substantially midway of its ends. The inner end of this rod is projected into the bore of the casing and is provided with an offset or crank terminal 25, operating in a socket or seat 26, formed in the valve-stem, so that by rotating the rod the valve-stem may be shifted to either limit, and said stem is locked at each limit against accidental endwise movement under the action of the water by means of the crank-terminal 25. A suitable packing 27 is placed in the lower portion of the sleeve 23, and a stuffing-box 28 is provided at the upper end of the sleeve, through which the rod 22 projects and is provided at its upper end with a suitable handle 29 for convenience in rotating the rod.

It will here be explained that when the valve-casing is exposed for ready access the controlling-rod 22 and the sleeve therefor may be comparatively short; but when the valve is buried in the ground or otherwise located, so as not to be readily accessible, the rod and the sleeve will of course be of a length to extend to a point which is readily accessible.

Having fully described the invention, what is claimed is—

1. A waste-valve including a casing having an inlet at one end, an outlet at the opposite end and an intermediate waste-port, an endwise-shiftable stem working in the casing and provided with a longitudinal slot extending at opposite sides of the waste-port, a valve carried by the stem and controlling the inlet, a tubular open-ended valve embracing the slotted portion of the stem and controlling the waste-port, and means for shifting the valve-stem to actuate the valves.

2. A waste-valve including a casing having an inlet at one end, an outlet at the opposite end and an intermediate waste-port, an endwise-shiftable valve-stem working in the casing and provided with a longitudinal bifurcation in that end of the stem which is adjacent the outlet, and a tubular open-ended valve embracing the bifurcated portion of the stem and disposed to control the waste.

3. A waste-valve including a casing having an inlet provided with a valve-seat at one end and an outlet at the opposite end of the casing and provided with a valve-seat and a waste-port leading from said seat, an endwise-shiftable valve-stem working in the casing and provided with a screw-threaded and bifurcated terminal in the outlet end of the casing, a screw-threaded bushing fitted to a screw-threaded part of the stem, a yieldable packing embracing the bushing and constituting a valve to engage the seat at the outlet of the casing and close the waste-port, and a valve carried by the opposite end of the stem for coöperation with the seat of the inlet.

4. A waste-valve including a tubular open-ended casing having a waste-port near the outlet end thereof, an endwise-shiftable stem working in the casing, valves carried by the stem for controlling the inlet and the waste-port respectively, the stem having a passage leading from the inner side to the outer side of the valve which controls the waste-port, and stem-controlling means piercing the casing intermediate of the valves.

5. A waste-valve including a tubular open-ended casing, the bore of the casing being enlarged at opposite ends to form valve-seats, an endwise-shiftable stem working in the casing and provided with a bifurcation at the outlet end of the casing, a valve carried by the stem and coöperating with the seat at the inlet end of the casing, another valve embracing the bifurcated end of the stem and coöperating with the seat at the outlet end of the casing, said seat having a waste-port controlled by the adjacent valve, and stem-actuating means piercing the casing intermediate of the valves.

6. A waste-valve including a tubular open-ended casing, an endwise-shiftable valve-stem working in the casing and provided with a longitudinal bifurcation at the outlet end of the casing, said bifurcated portion being externally screw-threaded, a tubular open-ended bushing fitted upon the screw-threaded part of the stem, a yieldable packing embracing the bushing, the casing having a waste-port controlled by the packing as a valve, a valve carried by the opposite end of the stem for controlling the inlet of the casing, and stem-controlling means piercing the casing intermediate of the valves.

7. A waste-valve including a tubular open-ended casing having an inlet at one end, an outlet at the opposite end and a waste-port at the outlet end, an endwise-shiftable valve-stem working in the casing and provided with a longitudinal bifurcation at the outlet end of the casing, the bifurcated end of the stem being externally screw-threaded, a tubular open-ended bushing fitted to the screw-threaded portion of the stem and provided with a yieldable packing embracing the bushing and constituting a valve for the waste-port, a valve carried by the stem and controlling the inlet, and an actuating rotatable spindle piercing the casing intermediate of the valve and having an inner crank-terminal engaging a seat in the valve-stem.

In testimony that I claim the foregoing as my own I have hereto affixed my signature in the presence of two witnesses.

CHRISTIAN W. KENNER.

Witnesses:
M. H. AMPHLETT,
M. E. KAAS.